Dec. 31, 1940. K. SCHLESINGER 2,227,011
TELEVISION SCANNING MEANS
Filed Sept. 29, 1936 2 Sheets-Sheet 1

Inventor:
KURT SCHLESINGER
By H. Y. Grover
Attorney

Dec. 31, 1940.    K. SCHLESINGER    2,227,011
TELEVISION SCANNING MEANS
Filed Sept. 29, 1936    2 Sheets-Sheet 2

Inventor:
Kurt Schlesinger

Patented Dec. 31, 1940

2,227,011

UNITED STATES PATENT OFFICE 2,227,011

TELEVISION SCANNING MEANS

Kurt Schlesinger, Berlin, Germany, assignor, by mesne assignments, to Loewe Radio, Inc., a corporation of New York Application September 29, 1936, Serial No. 103,133 In Germany October 4, 1935

2 Claims. (Cl. 178—7.6)

The production of television images with the assistance of perforated discs meets with difficulties in the case of an increase in the number of lines owing to insufficient light intensity of the lighting current passed through the scanning apertures. It is already necessary in the case of 180 lines to employ arc lamps for passing the light through films. A scanning of persons is no longer capable of being performed at circumferential velocities of 3,000 R. P. M. An increase of the circumferential velocity to twice the amount corresponding to 4 revolutions per image certainly permits of a corresponding increase in the number of lines under equal lighting conditions, but already leads to considerable mechanical complications.

Substitution of the perforated disc by the known lens disc is accordingly advisable particularly in the case of high-quality television scanning means.

The present invention is relative to a television scanning means with rotating rim of lenses in which the object reproduced by the rotating lenses is represented by a real intermediate image generated with the aid of a special reducing optic from a correspondingly greater perforated diaphragm which is intensively illuminated by a light source. According to further features of the invention the rotating lenses reproduce, either directly or with the assistance of fixed lenses, a screen area, which may be stationary or in motion, on a diaphragm of the order of an image point, or vice versa, and that a two-dimensional scanning of the screen area is introduced either by a two-dimensional arrangement of the lenses on the rotating support or by a synchronised movement of the object reproduced by the rim of lenses vertically to the advancing movement of the lenses.

The novel features which I believe to be characteristic for my invention are set forth with particularity in the appended claims. My invention, however, both as to its organization and method of operation together with further objects and advantages thereof may be best understood by reference to the following description taken in connection with the accompanying drawings, in which Figs. 1—2 and 4—5 show exemplary embodiments using scanning discs furnished with lenses in the apertures, while In Fig. 3 there is employed an endless band circularly bent.

Figure 1:
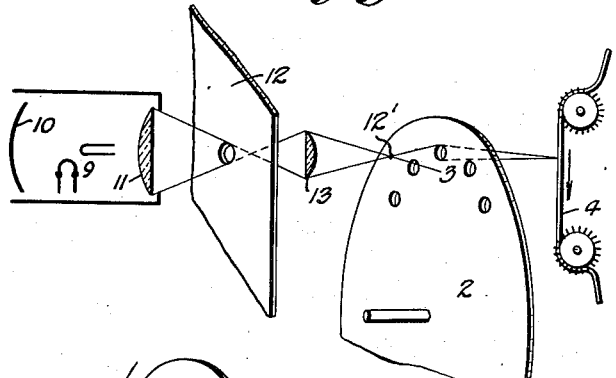

According to the invention, therefore, the spot of light itself is obtained as a reduction of a comparatively large perforated diaphragm. In Fig. 1 there is shown an optical system of this nature. An arc lamp 9, which is certainly only required for scanning transmitters—otherwise an incandescent lamp is sufficient in place thereof—is located in a hollow reflector and condenser system 10/11. The point of greatest constriction of the cone of light is disposed in the space between a diaphragm 12 and a reproducing lens 13. The reproducing lens 13, preferably a high-quality lens having a short focal distance, produces a reduction of the aperture of 12, which is reproduced in the form of an actual intermediate image 12'. The extent of this reduction is limited substantially by the fact that the bundle of rays emerging behind the intermediate image requires to light evenly the width of the section represented by the spacing between two lenses 3 on the lens disc 2. The reduction, therefore, may be carried to a further extent than the subsequent enlargement by way of the lens disc. An approximately tenfold reduction is possible, which may be performed quite well with optical means known per se (sound film optical system). In Fig. 1 there is shown behind the lens disc, in which the lenses are disposed about a circle ("circular lens disc"), the film 4, which is moved evenly from the top towards the bottom. In this way there occurs a simple and single scanning of each film image with $Nn$ lines, whereby $N$ represents the number of revolutions of the disc 2 for each image advance of 4 and $n$ the number of small lenses 3 provided about the periphery of the lens disc.

For interlaced line scanning purposes the system illustrated in Fig. 1 requires certain additions. In the case of this scanning method it is particularly convenient to combine an evenly moved film with a two-dimensional image point movement, whereby the vertical movement of the image point is directed in opposition to the vertical advancing movement of the film, corresponds as regards the height of its jump with the height of the film image, and is synchronised in such fashion with the film advancing means that a relaxation period of the image point movement coincides with an image change. In earlier applications (for example U. S. Patent application Nos. 36,008/35 and 45,729/35) this problem has been solved by the use of perforated discs having a plurality of image point spirals, whereby there were provided as many apertures in the disc as there were lines to be transmitted. That which has been said in respect of the aperture disc may also be applied literally to the lens disc.

Figure 2:
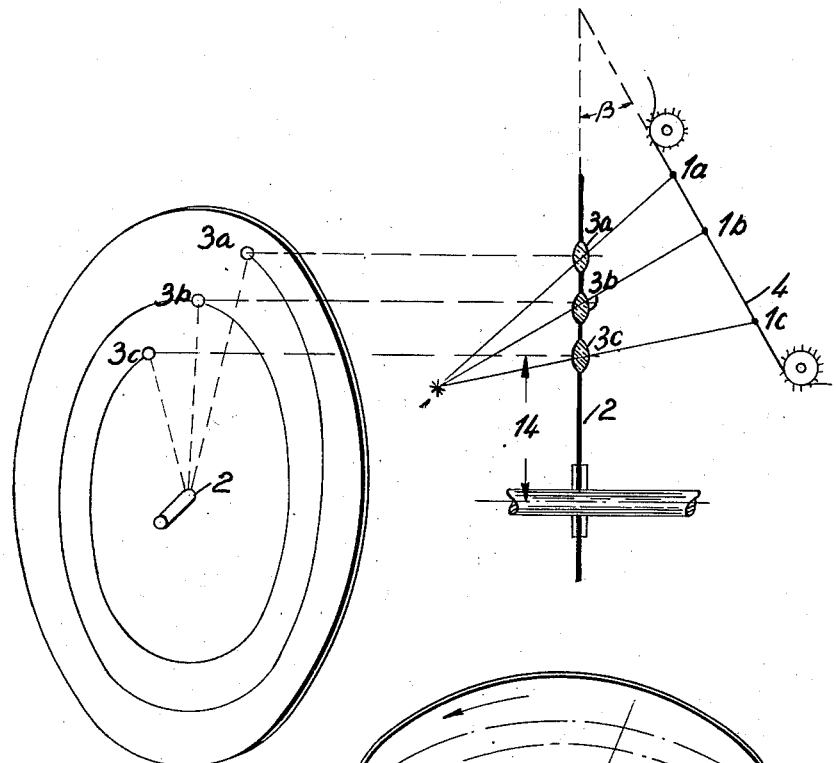

In Fig. 2 there is shown a multiple-spiral lens disc. The same projects images of an illuminating spot of light 1 with the aid of the lenses 3 on to the film 4. The different spiral turns are released consecutively by a covering diaphragm. By the provision of the lenses at equal centri-angles there occurs the difficulty of trapezoidal distortion of the screen area, which was also recognised in the case of the spiral aperture disc in the applications above referred to. The length of arc of the inner spiral turns is smaller than that of the outer ones, and if the spot of light 1 were applied to a middle radius the screen area resulting behind the disc 2 would be a trapezium. According to the invention the location of the spot of light 1, in accordance with Fig. 2, is situated in a smaller axial spacing than would correspond with the middle radius. In accordance with the invention the spacing 14 is so selected in Fig. 2 that the image points 1a, 1b, 1c describe arcs of equal length when the disc 2 is rotated about a given angle to the centre. The spot of light 1 must obviously be disposed nearer to the inner lenses 3c than to the outer lenses 3a. The ratio of the spacing of the spot of light and the outermost and innermost rim of lenses must correspond with the ratio of the radial spacing between these lenses and the axis of the disc. If this is carried into effect, the sharp reproductions of the spot of light 1 are situated in a plane 4, which encloses an angle with the plane of the disc 2. The angle is designated $\beta$. The film must move in the plane of sharp reproduction indicated by $\beta$, and is mounted in accordance with the invention in correspondingly inclined fashion (Fig. 2).

Figure 3:
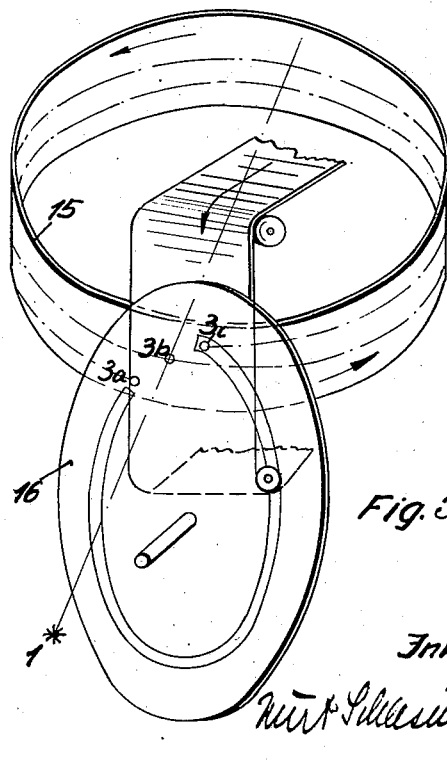

The difficulties associated with trapezoidal distortion and the corresponding correction by inclination and displacement may be eliminated if the lenses are arranged not on a circular disc but on a circularly bent band, i. e., on a cylinder facing and the cylinder is caused to rotate about its axis. A form of embodiment of this kind is illustrated in Fig. 3. The cylinder face 13 rotates about a vertical axis and is furnished with the lenses 3a—3c in spiral disposal about its periphery, whereby the number of spiral turns correspond with the number of revolutions on the part of the cylinder necessary for the advance of a film image. The spot of light 1 is situated on a straight line passing through the middle lens 3b vertically to the face of the cylinder. In an arrangement of this nature distortions can obviously only result by reason of the difference between the outer rays 1—3a or 1—3c and the middle ray 1—3b, and these displacements may be made very small by the use of lenses having a comparatively long focal distance and small pitch of the spiral. A special covering diaphragm 16 also ensures in this case a shading of the parts of the spiral not in use.

Figure 4:
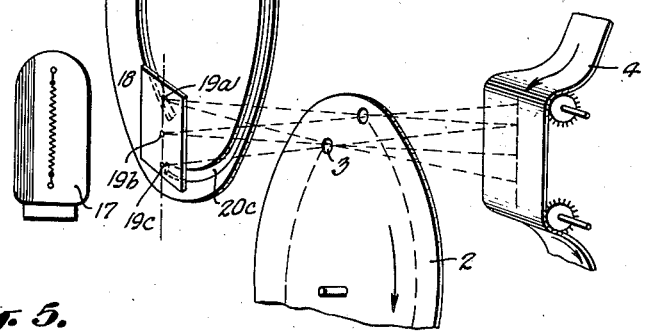

In the case of multiple spirals according to Figs. 2 and 3 it is a burden to have to provide just as many lenses as there are lines. It is desirable to be able to manage with a fraction of the number of lenses. According to the invention, this may be accomplished by the fact that a plurality of spots of light are employed in conjunction with merely one single-turn spiral, and by means of a synchronously rotating diaphragm these spots of light, which are superimposed in the radial direction, are uncovered alternately. In this manner the screen area is divided into zones which join up with each other. In Fig. 4, for example, a filament lamp 17 illuminates a diaphragm 17 having three apertures 19a, 19b, and 19c. A diaphragm 20 rotates with the incisions 20a, 20b, and 20c past this diaphragm and completes a single revolution in the time in which the film 4 has advanced by the height of one image. In this image-change period the disc 2 having the single-turn spiral rim of lenses 3 has revolved altogether as many times as there are image points 19—in the present example, therefore, three times.

In accordance with the invention there is always selected in arrangements of this kind, in which merely a fraction of the number of lines is provided on the disc in the form of lenses, merely an odd number N of revolutions for each image advance, and always an odd number of lenses $n$ are provided on the disc. It is only in this way that it is possible to decompose a complete image into an odd number $n$ of lines, as there exists the relation: $z=N\cdot n$, whereby the number of lines $z$, according to the known law governing interlaced lines, must be an odd one if it is desired to obtain interlaced line scanning with uniform movement of disc and film. Example: 25 images per second, $z=405$ lines.

Case A: $N=1$, $n=405$, 1,500 R. P. M.
Case B: $N=3$, $n=135$, 4,500 R. P. M.
Case C: $N=5$, $n=81$, 7,500 R. P. M.

Any other than the stated number of revolutions or a still higher number of revolutions of an odd order are impossible, as otherwise the product $N\cdot n$ would not be an odd number. The odd number of revolutions per image period are conveniently vibrations from the alternating current operating the film advancing motor, and the harmonics of the mains current thus obtained are conducted to a synchronous motor which possesses the requisite number of pairs of poles.

*Example*

Case B: Mains current 50 $\sim$ 25 images per second, 3 harmonics=150 periods, synchronous motor 4 poles, 2 pairs of poles corresponding with 75 revolutions per second.

The generation of the harmonic vibrations may take place in the known fashion by rotary or stationary frequency transformers. Of the stationary frequency transformers devices which operate with over-saturated iron chokes and subsequent frequency selection are particularly advisable.

All of the described devices with lens discs for interlaced line scanning call for a spiral arrangement of the lenses. A very much greater simplification in the production of the lens discs would be obtained if the lenses could be disposed about a circular periphery and the radial shift from point to point could be avoided. In a circular lens disc of this nature all difficulties are eliminated which result from the different lengths of arc of the inner and outer turns of the spiral.

Figure 5:
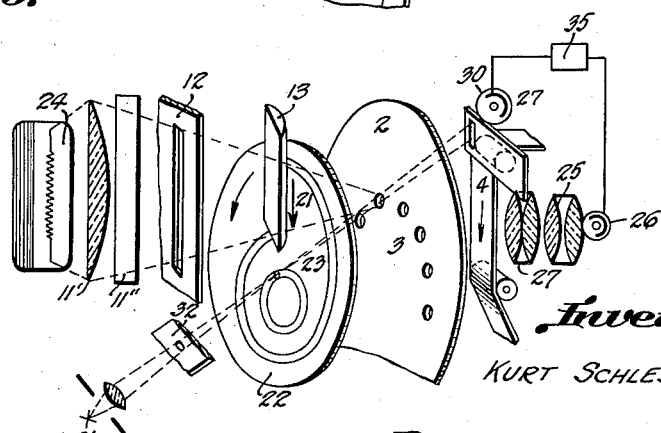

A form of embodiment of a lens disc scanning device of this kind is illustrated in Fig. 5. The circular lens disc 2, which is provided with the lenses 3 in constant spatial disposal from the central point, again rotates an odd number of times N per transmission period of a part-image of the film 4 and contains itself an odd number of lenses. A stationary image point situated in front of the disc will accordingly scan the film 4 only in a horizontal direction over a continuously recurring line track. The necessary vertical movement is obtained in accordance with the invention by the fact that as light source there is employed an air image 21, which extends in line-like fashion and is produced as intermediate image of a gap-like optical system, and that this air image is intersected by a rotating spiral line and the point of intersection of spiral and intermediate image is employed as object point of the lens disc reproduction. The air image 21 is situated in Fig. 5 perpendicularly in a plane of reproduction which is transmitted sharply to the film 4 by the lens 3. The spiral 22 is made of opaque material and contains a very fine clear-vision spiral line 23. Both the thickness of the luminous line 21 as well as of the clear spiral 23 are of the order of magnitude of the requisite image-point diameter on the film 4, with consideration to the enlargement or reduction provided by the lens disc. In the case of an image point of 40 μ and an advisible two-fold enlargement by the lens disc the luminous points should accordingly have a side length of 20 μ. The production of the luminous line 21 takes place, as already stated, by a reducing optical system, which is formed by the cylinder lens 13 and the gap 12, whereby the gap 12 in this case is preferably intensely lighted by a filament lamp 24 with the use of cylinder condensers 11' and 11''. The cone of light behind the intermediate reproduction is adjusted to be so wide that the section width of the circular lens disc is generously illuminated. The spiral 22/23 is produced most simply in photographic fashion by reduction of a spiral drawn in correspondingly larger size, the thickness of line of which spiral may be produced sufficiently evenly by draughtsman's means, and which is preferably obtained by winding a thread about a central core on the drawing board. Upon the scanning of a film the spiral 23 requires to rotate once for each image change, i. e., with 1,500 revs. for 25 images. It would then be driven by a 4-pole synchronous motor.

If in the same machine a direct scanning is desired by means of a moving ray of light, the photo-cell lens 25 together with the photo-cell 26 is merely rocked away and the screen area 4 projected into the space with the aid of the projecting lens 27. At the same time the film 4 has naturally been eliminated and the spiral 23 performs 3,000 R. P. M. According to the invention the operating motor for the spiral is in this case raised to twice the circumferential velocity, for example by the parallel connection of each two adjacent poles of a four-pole synchronous motor or equally well by gearing—gear wheels, transmissions, etc. The direction of rotation of the spiral which is shown in the drawing should be selected so that the image point behind the disc when scanning films moves in opposition to the movement of the film, whilst in the scanning of persons it preferably moves from the top towards the bottom.

In Fig. 5 there is shown a combination of a circular lens scanning device for interlaced line scanning with the automatic synchronisation. The synchronisation cell 27 is poled in the same sense as the image cell 26—in both cases the cathode is connected with the amplifier input. In order, however, to obtain the correct sign of the synchronisation impulses as regards the image signals, a single-stage reversing amplifier 35 is in accordance with the invention connected in the lead between synchronisation cell and main image amplifier 34.

I claim:

1. Television scanning means comprising a point-like light source, a rotating disc provided with a double spiral of lenses for interlaced scanning and a film gate, said source being arranged nearer to the disc axis than the innermost of said lenses, said gate being arranged at an angle to said disc for compensating the keystone effect.

2. A television scanning means comprising a linear light source, a fixed diaphragm having several holes, a shutter disc having the same number of bent apertures, a rotating lens disc and a film gate, said light source illuminating said holes, said shutter disc rotating as many times slower than said lens disc as there are holes in said diaphragm, said apertures uncovering alternately said holes, said lenses being adapted for scanning said film gate by projecting images of said holes upon said film gate.

KURT SCHLESINGER.